United States Patent [19]
Frame, Sr. et al.

[11] Patent Number: 5,477,207
[45] Date of Patent: Dec. 19, 1995

[54] WARNING DEVICE FOR A VEHICLE AND TRAILER COUPLING SYSTEM

[75] Inventors: Charles E. Frame, Sr., Lancester; Mark F. Blessing, Plano, both of Tex.

[73] Assignee: C & M Safety Systems, Inc., Dallas, Tex.

[21] Appl. No.: 130,900

[22] Filed: Oct. 4, 1993

[51] Int. Cl.⁶ ................................................. G08B 21/00
[52] U.S. Cl. ........................ 340/431; 340/425.5; 307/9.1; 280/432
[58] Field of Search ........................... 340/431, 425.5, 340/686, 687; 307/9.1, 10.8; 200/51.09, 51.1; 280/432, 433

[56] References Cited

U.S. PATENT DOCUMENTS

| | | | |
|---|---|---|---|
| 2,387,625 | 10/1945 | Walther et al. | 177/311 |
| 3,479,057 | 11/1969 | Miller. | |
| 3,535,679 | 10/1970 | Connors | 340/52 |
| 3,697,974 | 10/1972 | Harris et al. | 340/275 |
| 4,127,855 | 11/1978 | Toner | 340/687 |
| 4,593,264 | 5/1986 | Engle | 340/52 |
| 4,627,633 | 12/1986 | Gehman | 280/432 |
| 4,988,116 | 1/1991 | Evertsen | 340/687 |

*Primary Examiner*—Edward L. Coles, Sr.
*Assistant Examiner*—Thomas D. Lee
*Attorney, Agent, or Firm*—Cushman Darby & Cushman

[57] ABSTRACT

A warning device for a coupling system including a non-mechanical switching device for determining whether a latching mechanism in the coupling system is locked and a signalling device. The switching device providing a first output the latching mechanism is locked and a second output when the latching mechanism is unlocked. The signalling device providing one of a plurality of unique signals to an operator based on the outputs provided by the switching device, wherein each of the plurality of unique signals indicates a unique coupling condition of the coupling system.

10 Claims, 5 Drawing Sheets

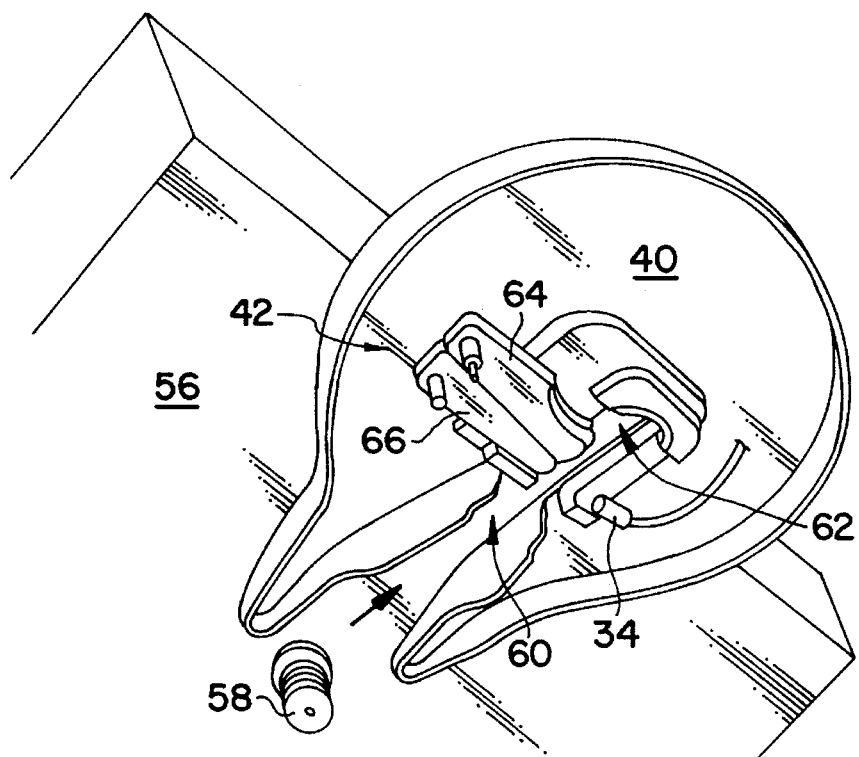
FIG. 3
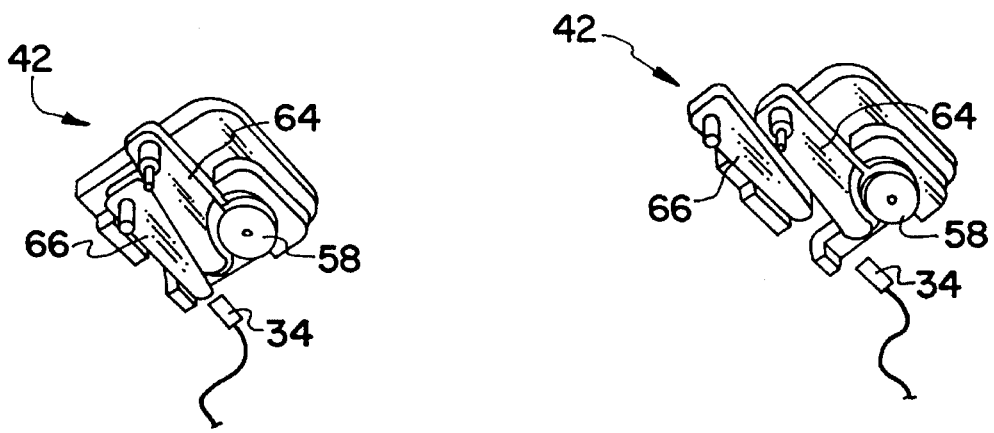
FIG. 4a   FIG. 4b

WARNING DEVICE FOR A VEHICLE AND TRAILER COUPLING SYSTEM

BACKGROUND OF THE INVENTION

1. Summary of the Invention

The present invention relates to a warning device for a vehicle and trailer coupling system, and, in particular, to a warning device that provides a vehicle operator with information regarding the coupling condition of the coupling system, thereby alerting the operator when the vehicle and trailer are not properly coupled.

2. Background of the Invention

Conventional tractor-trailer combinations are coupled together by linking a kingpin, which is a cylindrical-shaped rod extending from the bottom of the trailer, to a fifth wheel, which is a plate pivotably mounted on the tractor. Coupling is achieved by positioning the tractor under the trailer such that the kingpin enters a V-shaped channel in the fifth wheel. A latching mechanism associated with the fifth wheel engages the kingpin, locking it within the crotch of the V-shaped channel.

To safely operate the tractor-trailer combination, the kingpin must be properly engaged by the latching mechanism during coupling and must not become disengaged during transit. Several devices are known for alerting the tractor-trailer operator that the kingpin is not properly positioned and/or locked within the fifth wheel. U.S. Pat. No. 3,697,979 to Harris et al., U.S. Pat. No. 3,535,679 to Connors and U.S. Pat. No. 2,387,628 to Walther et al. are examples of such devices.

Harris teaches a warning device having a first spring-biased mechanical switch located at the crotch of the fifth wheel channel and a second spring-biased mechanical switch located along the side of the channel. If the latching mechanism prematurely closes during coupling or opens thereafter, the switches close, thereby energizing a series connected lamp 14 (see FIG. 1 of Harris). Connors teaches a signalling mechanism having a first spring-biased mechanical switch that actuates with the movement of a hook-type latching mechanism and a second spring-biased mechanical switch that actuates when the fifth wheel pivots from horizontal. If the tractor and trailer are not properly coupled or have become uncoupled, the switches serially connect a power supply to a lamp 35 and buzzer 34 (see FIGS. 6–8 of Connors). Walther teaches a warning device including a single spring-biased mechanical switch actuating with the movement of pivotable jaws that hold the kingpin within the fifth wheel. Lamp 54 (see FIG. 5 of Walther), which is connected in series with the switch, is lit when the jaws are closed and is extinguished when the jaws are opened.

All of the above-described signalling devices employ spring-biased mechanical switches. Mechanical switches, however, wear out over a period of time and are susceptible to mechanical failure, especially in the harsh operating environment under the tractor-trailer fifth wheel. Additionally, debris from the road and/or grease from the tractor-trailer coupling system can interfere with the operation of the mechanical spring and/or prevent adequate electrical contact in the switch.

Furthermore, the above-described warning devices do not provide different signals to the operator that correspond to the different coupling conditions between the vehicle and trailer. For example, it is not possible for an operator viewing the binary output of the above devices to determine whether the latching mechanism has recently unlocked or has been unlocked for an extended period of time.

Finally, the above-described warning devices do not permit the operator to readily determine whether the device is operational unless the latching mechanism actually unlocks. As a result, there is a danger that the operator will assume that the lamp has not been activated because the vehicle and trailer are properly coupled, when, in fact, the lamp is burnt out.

SUMMARY OF THE INVENTION

It is, therefore, an object of the present invention to provide a warning device that overcomes the problems associated with the above-described devices. In accordance with the principles of the present invention, this object is achieved by providing a warning device for a vehicle and trailer coupling system comprising a non-mechanical switching device for determining whether a latching mechanism in the coupling system is in a locked position and a signalling means that provides different output signals to the operator based on the coupling condition of the coupling system. In a preferred embodiment of the present invention, the switching device is a proximity switch, which is non-mechanical in that it is electro-magnetically actuated so as to detect the presence of an object close to it. The proximity switch is positioned adjacent the latching mechanism such that it provides a first output when the latching mechanism is locked and a second output when the latching member is unlocked. The signalling means activates a plurality of signalling elements in different patterns based on the output of the proximity switch; each pattern represents one of the coupling conditions of the coupling system. The operator can thus readily determine the state of the coupling system based solely on the signal provided by the warning device.

It is another object of the present invention to provide a warning device that includes a diagnostic function enabling the operator to quickly determine whether the signalling elements in the warning device are functioning.

It is a further object of the present invention to provide a warning device that is simple in construction, economical to manufacture and effective in operation.

These and other objects of the present invention may best be understood with reference to the accompanying drawings wherein an exemplary embodiment is illustrated.

BRIEF DESCRIPTION OF THE DRAWINGS

FIG. 3 is a perspective view of the bottom of a fifth wheel showing the positioning of the proximity switch according to a first embodiment of the present invention;

FIGS. 4a and 4b are detailed perspective views of the fifth wheel latching mechanism illustrating the activation of the proximity switch;

DETAILED DESCRIPTION OF THE PRESENTLY PREFERRED EXEMPLARY EMBODIMENTS

Figure 1:
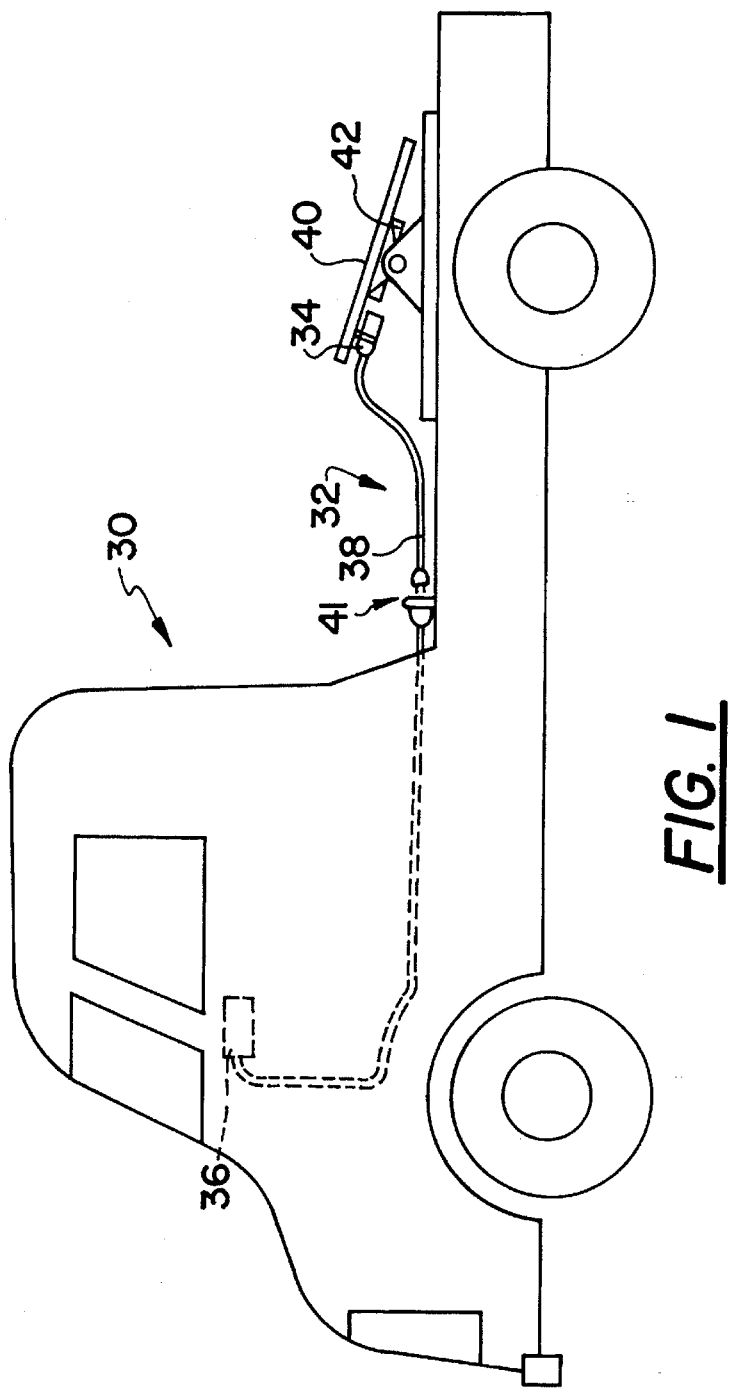
FIG. 1 is a schematic diagram of a warning device mounted on a vehicle according to the principles of the present invention.

FIG. 1 illustrates a vehicle 30, such as the tractor in a tractor-trailer combination, including a warning device, generally indicated at 32, according to the principles of the present invention. Warning device 32 includes a proximity sensing device in the form of a proximity switch 34 and a signalling device 36 connected to switch 34 via cable 38. Proximity switch 34 is mounted under the fifth wheel 40 near latching mechanism 42, and signalling device 36 is mounted inside the cab of the vehicle 30 so that it can be easily seen and heard by the operator. In a first embodiment of the present invention, cable 38 includes a plug 41 enabling switch 34 and signalling device 36 to be selectively disconnected from one another so that either component can be easily replaced without removing the entire device. However, in an exemplary embodiment of the present invention, plug 41 is eliminated. Warning device 32 is powered by the vehicle battery (not shown), which is typically 12 V DC. It to be understood, however, that warning device 32 may be powered by a dedicated power supply. In addition, fuses (not shown) may be provided where necessary to protect the components of the device.

Figure 2:
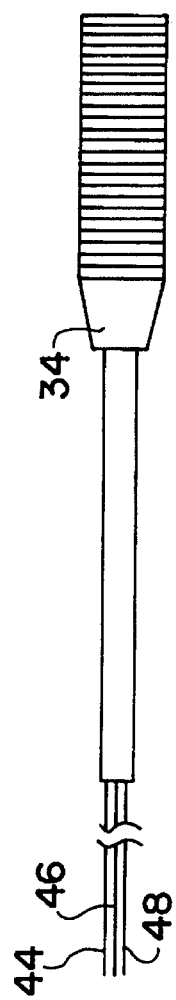
FIG. 2 is a schematic diagram of the proximity switch in the warning device of FIG. 1.
Figure 6:
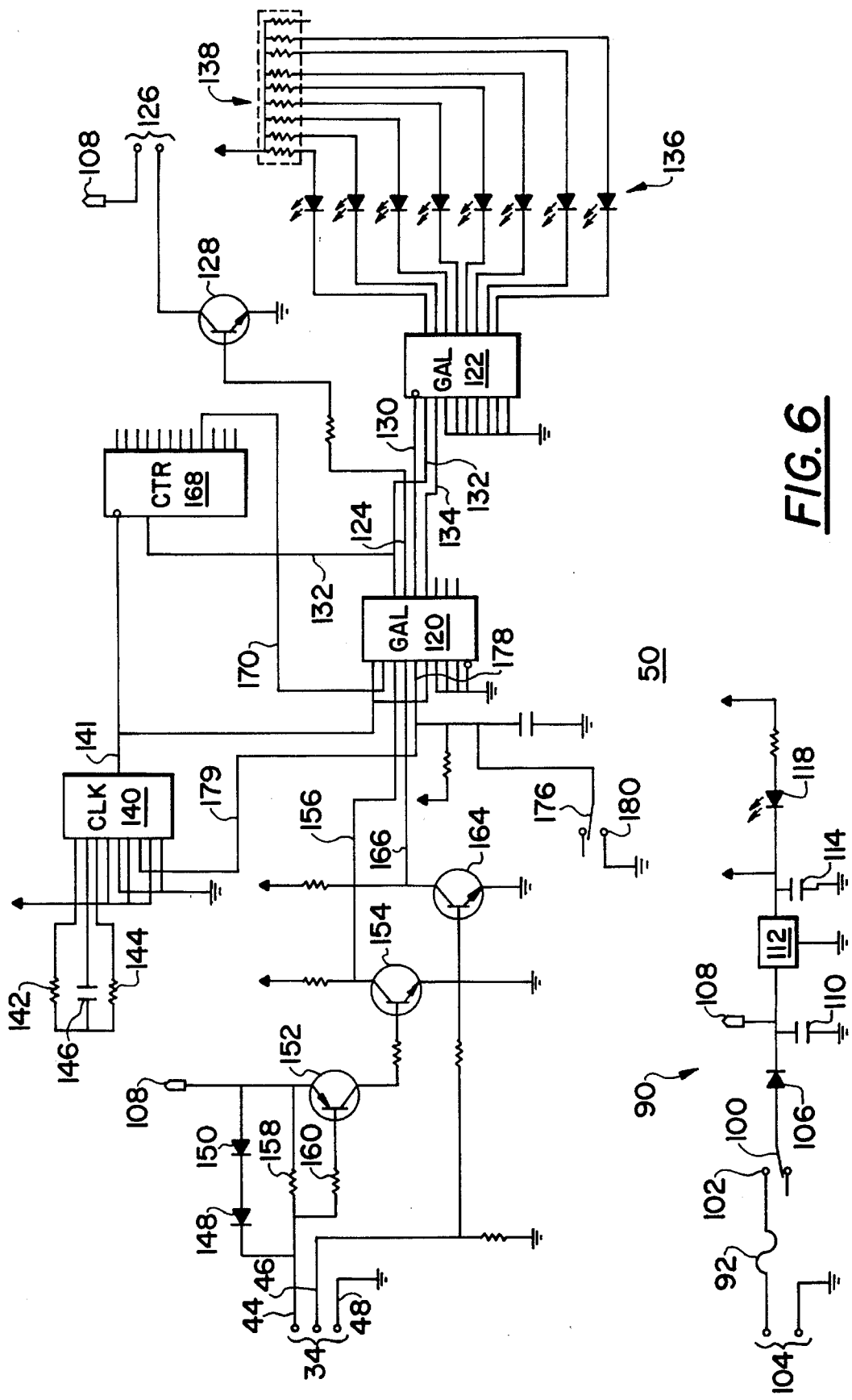
FIG. 6 is a schematic diagram of a signalling circuit for the warning device of FIG. 1.

Referring to FIG. 2, the proximity switch 34 is a non-mechanical switching device that includes three lines 44, 46, and 48 for connecting switch 34 to a signalling circuit 50 shown in FIG. 6. Proximity switch 34 is a shielded proximity switch, meaning that it electro-magnetically detects the presence of an object appearing within its detection window, which is at tip 52. When an object is within a predetermined distance (typically 5–10 mm) from tip 52, switch 34 activates, thereby providing a first output to the signalling circuit 50 of FIG. 6 on line signal 46. When not activated, a second output is provided on the same line. In a first embodiment of the present invention, a positive voltage is provided on signal line 46 when switch 34 is activated and no voltage when switch 34 is not activated. In a second embodiment, however, line 46 is connected to ground in switch 34 when activated, and is disconnected from ground when deactivated.

While the preferred embodiment of the present invention discloses an electro-magnetically actuated proximity switch, it is to be understood that any non-mechanical switching means that actuates with the locking of the latching mechanism is within the scope of the present invention. For example, switching mechanisms that are optically activated or activate by detecting reflected emissions (such as radar) are also suitable for use in the present invention.

Referring to FIGS. 3, 4a and 4b, proximity switch 34 is mounted under fifth wheel 40 near fifth wheel latching mechanism 42. In a first embodiment of the present invention, proximity switch 34 is mounted under fifth wheel 40 such that when latching mechanism 42 is locked, FIG. 4a, wedge 66 is near the tip of switch 34, and when latching mechanism 42 is unlocked, FIGS. 3 and 4b, wedge 66 is out of the detection range of switch 34. Consequently, proximity switch 34 is activated when latching mechanism 42 is locked and is not activated when it is unlocked. The latching mechanism shown in FIGS. 3, 4a and 4b is commonly known as a Fontaine latching mechanism, and, in addition to wedge 66, it includes a jaw 64 that engages kingpin 58 attached to trailer 56 when kingpin 58 is at the crotch 62 of channel 60.

Figure 5B:
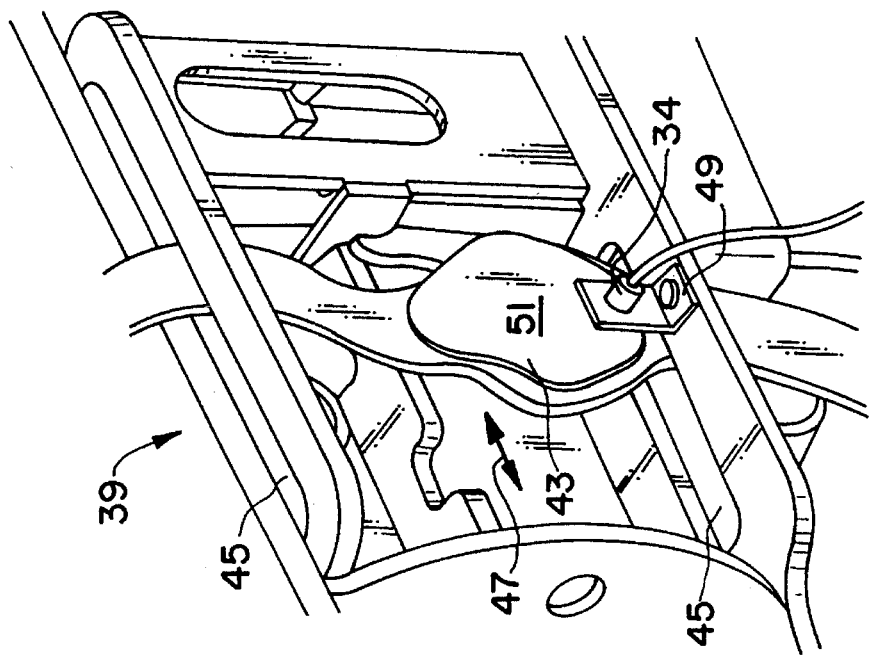
FIGS. 5a and 5b are perspective views of the bottom of a fifth wheel showing the positioning of the proximity switch according to a second embodiment of the present invention.
Figure 5A:
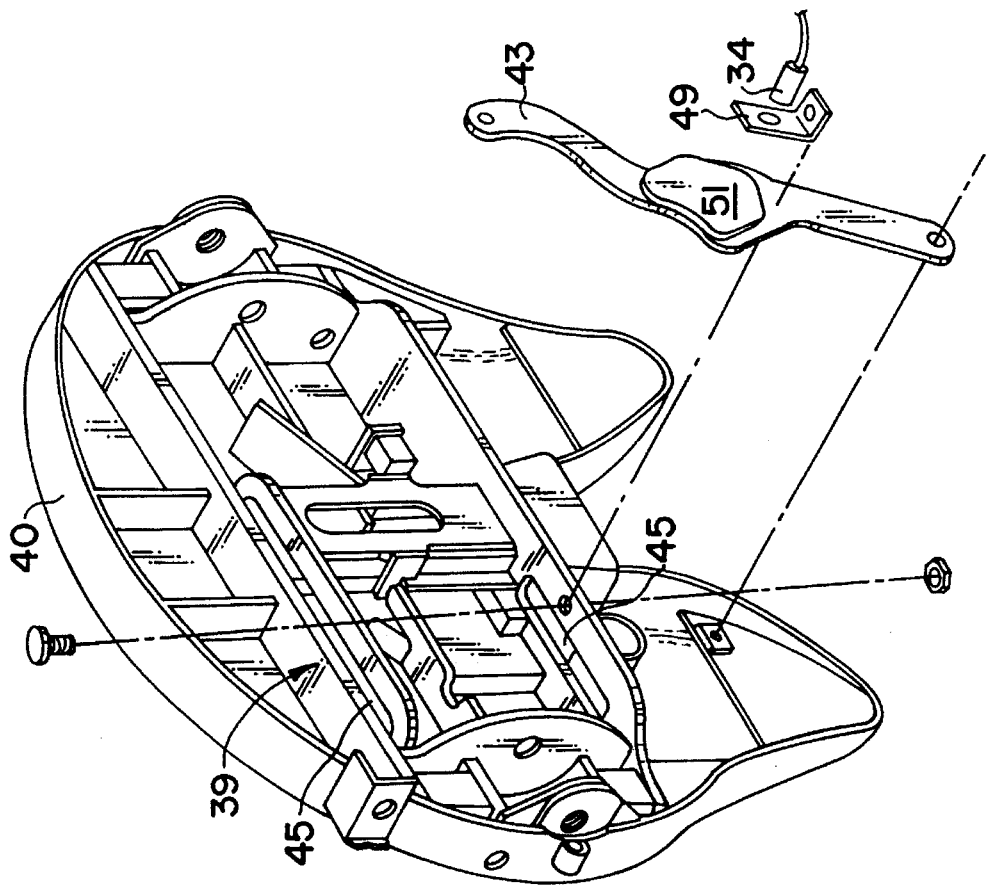

FIGS. 5a and 5b illustrate a second embodiment for the position of proximity switch 34 in a Fontaine latching mechanism, generally indicated at 39. A conventional Fontaine latching mechanism includes an operating bar 43 having one end pivotably mounted to fifth wheel 40 and another end attached to a manually operated handle (not shown). Operating bar 43 is slidably positioned within slots 45 such that movement of bar 43, as indicated by arrows 47, actuates the wedge and jaw (shown in FIGS. 3, 4a and 4b) through a device commonly known as a timer (not shown). FIG. 5b is a detailed view of Fontaine latching mechanism 39 showing operating bar 43 in a locked position. Proximity switch 34 is mounted on fifth wheel 40 via bracket 49 such that switch 34 is activated when operating bar 43 is in a locked position. More specifically, switch 34 actuates when raised surface 51 of operating bar 43 enters and exits its detection window. Positioning proximity switch as shown in FIGS. 5a and 5b minimizes the amount of movement possible in the latching mechanism before the proximity switch is actuated. It is to be understood that other positions for the proximity switch are possible so long as the proximity switch actuates when the latching mechanism is locked and unlocked. It is to be further understood that the present invention can be used in conjunction with other latching mechanisms, such as Holland or Simplex latching mechanisms, wherein the proximity switch is positioned such that it actuates when the latching mechanism is locked and unlocked.

Referring now to FIG. 6, there is shown a signalling circuit 50 for the warning device of FIG. 1. Circuit 50 includes a power supply circuit 90 and a pair of generic array logic (GAL) circuits 120 and 122, which are programmable logic devices. GAL circuits 120 and 122 are programmed to provide a specific output for each input received. More specifically, GAL circuit 120 is programmed to output different signals based on the input signals it receives from the circuit components, such as the proximity switch 34, and GAL circuit 122 drives an array of light emitting diodes (LEDs) 136 in various patterns based on the output of the GAL circuit 120.

Although switch 34 provides only first and second output signals, GAL circuit 120 enters four operating states based on these two outputs. The four operating states correspond to the following four coupling conditions between the vehicle and trailer: coupling; coupled; uncoupling; and uncoupled. The coupled and uncoupled operating states are stable states, meaning that GAL circuit 120 remains in these states until it receives new input signals instructing it to change operating states. The other states, coupling and uncoupling, are only entered into for a predetermined period of time. After which, GAL circuit 120 enters one of the two stable states. For each operating state, GAL circuit 120 provides a different signal to the operator via signalling element, such as LEDs 136 and/or buzzer 126. Thus, the operator is alerted to the coupling condition of the vehicle and trailer based on the signals provided by the signalling elements.

Power supply circuit 90 provides two different voltages to circuit 50 when switch 100 is in position 102. Power supply 104 provides 12 V DC to portions of circuit 50 through connections 108, and voltage regulator 112 provides 5 V DC to the remaining components. Capacitors 110 and 114 filter noise from the voltages supplied to circuit 50. Diode 106 protects circuit 50 in the event power supply 104 is reversed, and fuse 92 guards against power surges. Light emitting diode (LED) 118 is activated when power is provided to circuit 50, thereby signalling the operator that the warning device is "on".

GAL circuit 120 activates buzzer 126 by providing a signal on line 124 that forward biases npn transistor 128. LEDs 136, which are connected to the power supply through biasing resistors 138, are activated by providing signals on line 130, 132, and 134. GAL circuit 122 is programmed to decode the signals provided by GAL circuit 120 so that LEDs 136 are activated in different patterns. For example, GAL circuit 122 is programmed such that a signal on line 134 activates all of the LEDs 136 and a signal on line 132 activates LEDs 136 in a rotating fashion. Line 130 provides a clock signal for GAL circuit 122.

Programmable timer 140 provides the primary time base for circuit 50, wherein resistors 142 and 144 and capacitor 146 are selected to provide the RC time constant for the programmable timer.

Power is provided to proximity switch 34 via power supply line 44 through diodes 148 and 150. If no current is being supplied to switch 34, which can occur if, for example, plug 41 (FIG. 1) inadvertently opens, pnp transistor 152 turns on. The values for resistor 158 and 160 are chosen to ensure this occurs. When transistor 152 is turned on, it forward biases npn transistor 154, changing the input signal to GAL circuit 120 on line 156 from high to low.

When proximity switch 34 is activated as discussed above, signal line 46 is electrically connected to power supply line 44 in switch 34. This turns on npn transistor 164, changing the signal input to GAL circuit 120 on line 166 from high to low. In a second embodiment of the proximity switch, as discussed above, line 46 is connected to ground when switch 34 is activated. This configuration eliminates the need for transistor 164 and the associated resistor because line 46 can be connected directly to GAL circuit 120.

When proximity switch 34 is not activated, signal line 46 is disconnected from line 46 by switch 34. This turns off transistor 164, causing the signal on line 166 to change from low to high. These transitions on line 166 cause GAL circuit to changes operating states. For example, a transition from high to low causes GAL circuit 120 to change from the coupled state to the uncoupling state.

A counter 168 counts the clock signals output from the timer 140. Counting is initiated by a signal provided from GAL circuit 120 on line 132. Once a predetermined number has been reached, counter 168 outputs a signal on line 170 to GAL circuit 120, changing the operating state of GAL circuit 120.

Finally, a test/cancel switch 176 provides an input signal to GAL circuit 120 on line 178 when switch 176 is moved to position 180. This instructs GAL circuit 120 to activate all of the signalling elements 126 and 136 so that the operator can test whether they are functioning. If, however, GAL circuit 120 is in the uncoupling state when switch 178 is closed, GAL circuit 120 is instructed to change to the uncoupled operating state, and the signalling element test is not performed. Closing switch 176 also inputs a signal to timer 140 on line 179 to change its clock rate.

The operation of signalling circuit 50 as a trailer is coupled and uncoupled from a vehicle is discussed below. When circuit 50 is first activated, for example, by closing switch 100, GAL circuit 120 enters one of the two stable operating states, coupled or uncoupled, depending on the output of proximity switch 34. Assuming the trailer is not coupled to the vehicle when the device is turned on, i.e., the latching mechanism is not within a predetermined distance of the tip of the proximity switch, the input to GAL circuit 120 on line 166 is high. As a result, GAL circuit 120 is in the uncoupled state, where it activates LEDs 136 but not buzzer 126.

As the vehicle and trailer are coupled, the fifth wheel latching mechanism is locked. This activates proximity switch 34, connecting line 46 to the power supply via line 44. As discussed above, this changes the input to GAL circuit 120 on line 166. As a result, GAL circuit 120 enters the coupling state for a predetermined period of time, during which it activates buzzer 126 by beeping it two times.

After the buzzer is beeped twice, GAL circuit 120 enters the coupled state. In this state neither buzzer 126 nor LEDs 136 are activated.

If the latching mechanism unlocks, the input to GAL circuit 120 on line 166 is changed as discussed above. As a result, GAL circuit 120 enters the uncoupling state for a predetermined period of time, during which it activates LEDs 136 in a rotating fashion and activates buzzer 126. Counter 168 is activated by the signal provided by GAL circuit 120 on line 132, which also causes LEDs 136 to light in a rotating fashion. Circuit 50 remains in the uncoupling state until either switch 176 is moved to position 180, or counter 168 reaches a predetermined number after a period of time has elapsed. Either event causes GAL circuit 120 to enter the uncoupled state described above.

In addition to providing signals based on the operating states associated with the output of proximity switch 34, circuit 50 provides signals to the operator when switch 34 is not functioning. That is, when no current flow is detected in line 46, as discussed above, GAL circuit 120 flashes LEDs 136 in unison and beeps buzzer 126, thereby notifying the operator that the switch 34 is not functioning.

The outputs of the warning device in response to the coupling conditions of the coupling system and other inputs are summarized below.

|  | Output |
| --- | --- |
| Coupling Condition | |
| 1) Uncoupled | All LEDs on, buzzer off |
| 2) Coupling | All LEDs off, buzzer beeps twice |
| 3) Coupled | All LEDs off, buzzer off |
| 4) Uncoupling | LEDs flash in rotating manner, buzzer on |
| Other Inputs | |
| 5) Proximity Switch Disabled | All LEDs flash together, buzzer beeps |
| 6) Test | All LEDs on, buzzer on |

It is to be understood that the present invention is not limited to the specific outputs presented above. Instead, signals other than those listed above can be provided to the operator so long as a different signal is provided for each of the different coupling conditions.

Figure 7A:
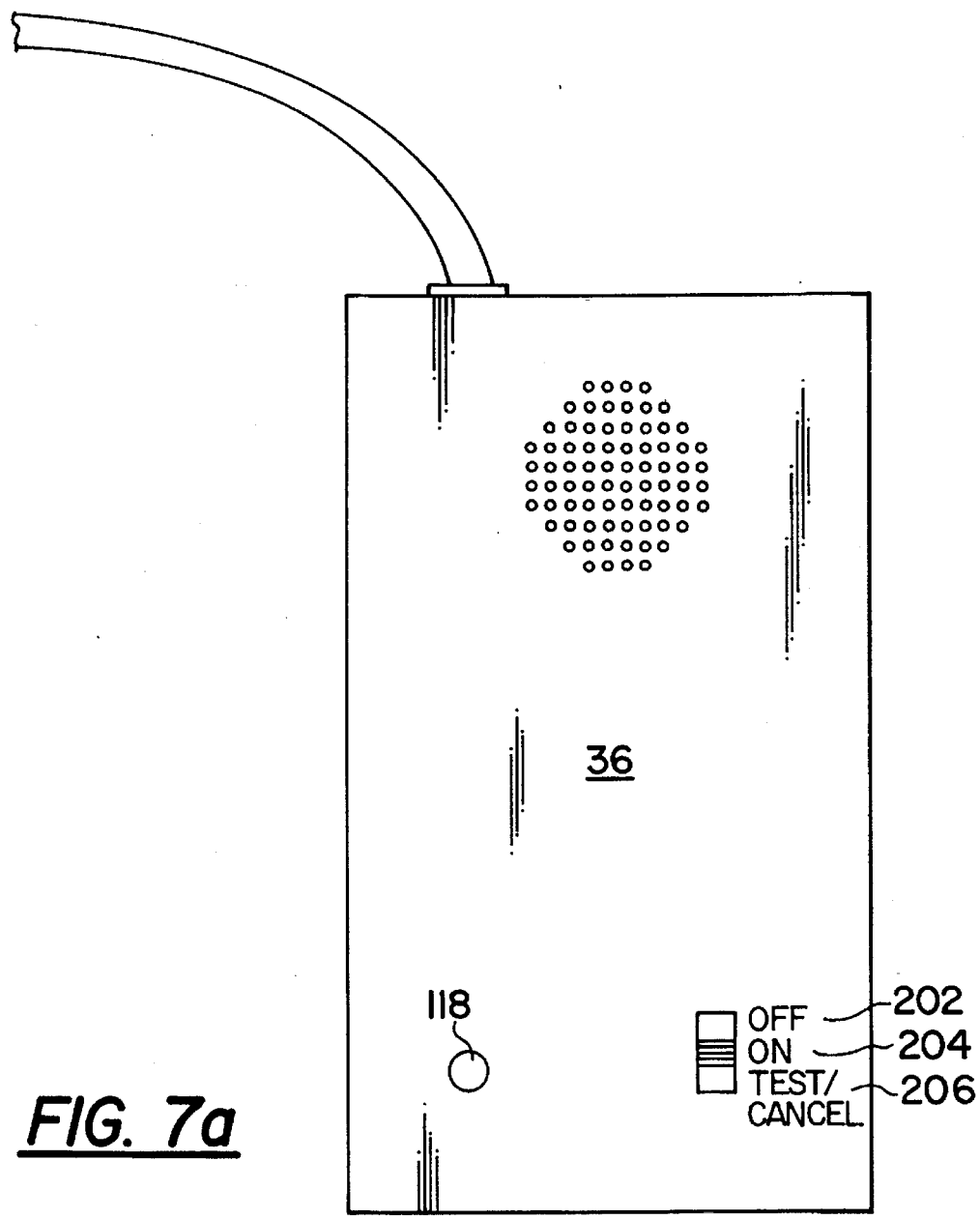
FIGS. 7a and 7b are top plan and front elevational views, respectively, of the signalling device for the warning device of FIG. 1.
Figure 7B:
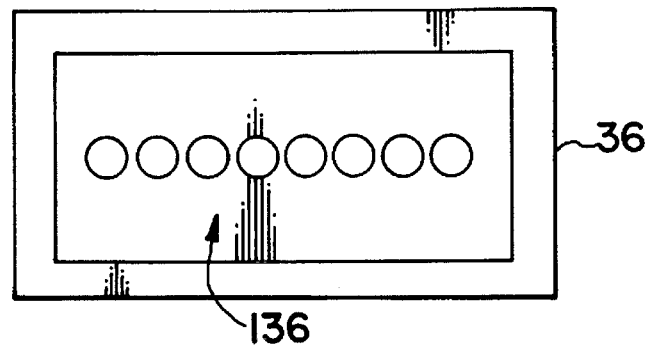

Referring now to FIG. 7a and 7b, there is shown a signalling device 36 housing the signalling circuit of FIG. 6. In a preferred embodiment of the present invention LEDs 136 of FIG. 6 are mounted across the front of signalling device 36 such that when lit in a rotating fashion, they flash left to right. LED 118 of FIG. 6 is mounted on the top of signalling device 36 and switches 100 and 176 are combined in a single three position switch 202. In the first and second positions 202 and 204 the warning device is off and on, respectively. The third position 206 is the test/cancel position that corresponds to position 180 of switch 176 of FIG. 6. In a first embodiment of the present invention, switch 202 is spring-biased such that when switch 202 is released while in third position 206, it returns to second position 204. In a second embodiment, switch 202 must be manually moved from position 206.

It can thus be realized that the objects of this invention have been fully and effectively accomplished. It should be appreciated, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A warning device for, a vehicle and trailer coupling system, said warning device comprising:

a non-mechanical switching means associated with a latching mechanism in said coupling system such that said latching mechanism activates said switching means when locked, said switching means providing a first output when activated and a second output when not activated; and signalling means for providing one of a plurality of unique signals to an operator based on said output of said switching means, wherein said plurality of unique signals provided to said operator by said signalling means include:

a first signal provided for a first predetermined period of time after said first output from said switching means is received by said signalling means, said first signal indicating that a vehicle and a trailer are coupling;

a second signal provided after said first predetermined period of time has elapsed, said second signal indicating that said vehicle and said trailer have been coupled for an amount of time greater than said first predetermined period of time;

a third signal provided for a second predetermined period of time after said second output from said switching means is received by said signalling means, said third signal indicating that said vehicle and said trailer are uncoupling; and a fourth signal provided after said second predetermined period of time has elapsed, said fourth signal indicating that said vehicle and said trailer have been uncoupled for an amount of time greater than said second predetermined period of time.

2. A warning device as defined in claim 1, wherein said signalling means comprises:

a plurality of signalling elements activated by said signalling means thereby providing said plurality of unique signals to said operator; and a first mechanical switch, wherein actuating said first mechanical switch during said first predetermined period of time causes said signalling means to cease providing said first signal to said operator via said plurality of signalling elements and causes one of said second signal and said fourth signal to be provided to said operator, said second signal being provided if said first output is provided by said switching means and said fourth signal being provided if said second output is provided by said switching means, and wherein actuating said first mechanical switch at a time other than during said first predetermined period of time activates all of said plurality of signalling elements thereby enabling said operator to determine whether said signalling elements are operational.

3. A warning device for a vehicle and trailer coupling system, said warning device comprising:

a proximity switch positioned adjacent said latching mechanism, wherein said proximity switch electromagnetically detects a member in said latching mechanism when said latching mechanism is locked, said switching means providing a first output when activated and a second output when not activated; and a plurality of signalling elements activated in a plurality of patterns, wherein each said plurality of patterns corresponds to one of said plurality of unique signals provided by said signalling means, and wherein said plurality of unique signals provided to said operator by said signalling means include:

a first signal provided for a first predetermined period of time after said first output from said proximity switch is received by said signalling means, said first signal indicating that a vehicle and a trailer are coupling;

a second signal provided after said first predetermined period of time has elapsed, said second signal indicating that said vehicle and said trailer have been coupled for an amount of time greater than said first predetermined period of time;

a third signal provided for a second predetermined period of time after said second output from said proximity switch is received by said signalling means, said third signal indicating that said vehicle and said trailer are uncoupling; and a fourth signal provided after said second predetermined period of time has elapsed, said fourth signal indicating that said vehicle and said trailer have been uncoupled for an amount of time greater than said second predetermined period of time.

4. A warning device as defined in claim 3, wherein said signalling means comprises:

a first mechanical switch, wherein actuating said first mechanical switch during said first predetermined period of time causes said signalling means to cease providing said first signal output to said operator via said plurality of signalling elements and causes one of said second signal and said fourth signal to be provided to said operator, said second signal being provided if said first output is provided by said proximity switch and said fourth signal being provided if said second output is provided by said proximity switch, and wherein actuating said first mechanical switch at a time other than during said first predetermined period of time activates all of said plurality of signalling elements thereby enabling said operator to determine whether said signalling elements are operational.

5. A warning device as defined in claim 4, further comprising:

a second mechanical switch for selectively connecting said warning device to a power supply; and indicating means for providing a power on signal to said operator thereby indicating that said warning device is connected to said power supply.

6. A warning device as defined in claim 5, wherein said proximity switch is located under a fifth wheel of a tractor in a tract-trailer combination.

7. A warning device as defined in claim 6, wherein said signalling means is provided in a housing to form a signalling device, said signalling device being mounted inside a cabin of said vehicle and coupled to said proximity switch through a connecting cable.

8. A warning device as defined in claim 7, wherein said plurality of signalling elements comprise a plurality of light emitting diodes and a buzzer.

9. A warning device as defined in claim 8, wherein said light emitting diodes and buzzer are actuated by a programmable microprocessor circuit.

10. A warning device as defined in claim 3, wherein said warning device includes a single switch having a first position, a second position, and a third position, wherein said warning device is off when said single switch is in said first position, said warning device is connected to a power supply when said single switch is in said second position, and if said single switch is moved to said third position during said first predetermined period of time, said signalling means ceases to provide said first signal to said operator then provides one of said second signal and said fourth signal to said operator depending on said output of said proximity switch, and if said single switch is moved to said third position at a time other than during said first predetermined period of time, said signalling means activates all of said plurality of signalling elements thereby enabling said operator to determine whether said signalling elements are operational.

* * * * *